Patented Nov. 4, 1924.

1,514,377

UNITED STATES PATENT OFFICE.

HERBERT H. DOW AND WILLIAM J. HALE, OF MIDLAND, MICHIGAN, ASSIGNORS TO THE DOW CHEMICAL COMPANY, OF MIDLAND, MICHIGAN, A CORPORATION OF MICHIGAN.

INSECTICIDAL COMPOUND.

No Drawing.    Application filed March 31, 1920.  Serial No. 370,188.

*To all whom it may concern:*

Be it known that we, HERBERT H. DOW and WILLIAM J. HALE, citizens of the United States, and residents of Midland, county of Midland, and State of Michigan, have jointly invented a new and useful Improvement in Insecticidal Compounds, of which the following is a specification, the principle of the invention being herein explained and the best mode in which we have contemplated applying that principle, so as to distinguish it from other inventions.

It has been proposed to use benzyl alcohol ($C_6H_5.CH_2OH$) directly as a disinfectant and also as a fungicide and insecticide, (see German Patent No. 297,667 of 1917). However, such alcohol, which is a rather heavy and more or less viscous liquid, sparingly soluble in water and boiling at 206° centigrade, cannot be conveniently or efficiently applied to growing plants and so has never come into commercial use so far as we are aware.

The object of the present invention accordingly is to provide a suitable vehicle or carrier for benzyl alcohol whereby the latter may be readily sprayed or otherwise applied to growing plants in such form as to be effective as an insecticide particularly for aphis and other similar sucking insects, as well as for the red spider, etc., that at times prove so destructive to fruit trees, flowering plants and shrubs. To the accomplishment of the foregoing and related ends the invention then consists of the ingredients hereinafter fully described and particularly pointed out in the claims, the following description setting forth but one of various combinations of such ingredients which are satisfactory for the purpose stated and are contemplated as coming within the scope of the invention.

As a preferred vehicle for such benzyl alcohol we employ a halohydrin, the most available as well as the best so far as we are at present aware, being a chlorohydrin derivative of an olefin such as ethylene chlorohydrin ($CH_2Cl.CH_2OH$) or propylene chlorohydrin ($CH_2Cl.CHOH.CH_3$). Where one or the other of the specific chlorohydrins just referred to is employed as the vehicle or solvent for the benzyl alcohol, the preferred proportions are one part alcohol to one part chlorohydrin. Such alcohol readily goes into solution in the chlorohydrin and the resultant product is freely and immediately soluble in water, and thus affords a solution which can be sprinkled or sprayed by familiar means on leaves and stems of the plant requiring treatment. The increased ease and rapidity with which the solution of the alcohol in water, when the alcohol is thus combined with the halohydrin, may be effected is of considerable practical importance even where the water is employed in an amount in excess of that in which the alcohol is directly soluble; while in the preferred stronger solution, the admixture of the halohydrin becomes essential.

The alcohol has at the same time a protective effect on the chlorohydrin, decreasing the hydrolytic action of water upon the latter, thus acting as a preservative not only while standing but after application. We have also found that the combination of ingredients just described serves as an excellent solvent for various so-called deadly insecticides, such as timboin, nicotine and derris (or "fish poison"). In utilizing such combination of ingredients in this connection, we preferably extract the poison first with the halohydrin, and admix the extract with benzyl alcohol in desired proportions, depending upon specific use to be made of insecticide. Furthermore, such combination of ingredients may readily be mixed with inert dry materials such as lime, lead, calcium or magnesium arsenate, and the like, capable of absorbing the same, and can then be applied in the form of a powder or dust, with highly satisfactory results.

Other modes of applying the principle of our invention may be employed instead of the one explained, change being made as regards the composition herein disclosed provided the ingredients stated by any of the following claims or the equivalent of such stated ingredients be employed.

We therefore particularly point out and distinctly claim as our invention:—

1. An insecticide comprising a solution of benzyl alcohol and a halohydrin, the amount of the latter being sufficient to render such alcohol freely soluble in water.

2. An insecticide comprising a solution of benzyl alcohol and a chlorohydrin derivative of an olefin, the amount of such derivative being sufficient to render such alcohol freely soluble in water.

3. An insecticide comprising solutions of benzyl alcohol and ethylene chlorohydrin in approximately equal proportions.

4. An insecticide comprising benzyl alcohol and an alkaloidal poison dissolved in a halohydrin.

5. An insecticide consisting of the halohydrin extract of derris admixed with benzyl alcohol.

Signed by us this 26th day of March, 1920.

HERBERT H. DOW.
WILLIAM J. HALE.